United States Patent [19]

Ochiai et al.

[11] Patent Number: 5,599,108
[45] Date of Patent: Feb. 4, 1997

[54] STATIC PRESSURE TABLE DEVICE WITH A TAPERED SURFACE

[75] Inventors: Akira Ochiai, Susono; Kouya Watanabe, Numazu, both of Japan

[73] Assignee: Toshiba Kikai Kabushiki Kaisha, Tokyo-to, Japan

[21] Appl. No.: 913,716

[22] Filed: Jul. 16, 1992

[30] Foreign Application Priority Data

Jul. 17, 1991 [JP] Japan ..................... 3-177027

[51] Int. Cl.⁶ ..................................... F16C 32/06
[52] U.S. Cl. ............................................ 384/123
[58] Field of Search ................... 108/20, 21, 22, 108/101; 384/105, 99, 100, 121–123, 107, 124

[56] References Cited

U.S. PATENT DOCUMENTS

| | | | |
|---|---|---|---|
| 2,877,538 | 3/1959 | Lonlon | 384/112 |
| 2,885,915 | 5/1954 | Schruger | 384/100 |
| 3,062,593 | 11/1962 | Royle | 384/121 |
| 3,583,205 | 6/1971 | Erle | 384/100 |
| 4,114,959 | 9/1978 | Christ | 384/100 |
| 4,256,312 | 3/1981 | Ikeda | 384/100 |
| 4,306,754 | 12/1981 | Kraus | 384/121 |
| 4,348,065 | 9/1982 | Yoshioka et al. | 384/121 |
| 4,568,203 | 2/1986 | Eddy | 384/121 |
| 4,618,270 | 10/1986 | Kraus | 384/121 |
| 4,696,584 | 9/1987 | Tielemans | 384/121 |
| 5,114,245 | 5/1992 | Tanka et al. | 384/112 |

FOREIGN PATENT DOCUMENTS 51490 12/1972 Japan.

OTHER PUBLICATIONS

"Static Pressure Lubrication Theory", published Feb. 9, 1968 by Japan Institute of Lubrication (Nihon Junkatsu Gakkai) (Editor: Yoshiro Mori).

Primary Examiner—C. D. Crowder
Assistant Examiner—Larry D. Worrell, Jr.
Attorney, Agent, or Firm—Cushman Darby & Cushman IP Group of Pillsbury Madison & Sutro LLP

[57] ABSTRACT

In a static pressure table device wherein an annular recess is formed in one of confronting surfaces of a stationary bed and a rotary table thereon, and static pressure oil is supplied to the recess for rotatingly support the table on the bed, a static pressure gap formed between the confronting surfaces of the bed and table is constructed to gradually or stepwise increase toward the outer periphery of the device. As a result, the viscosity resistance of the pressure oil is decreased toward the outer periphery and heat generation is reduced in the outer peripheral region, whereby a uniform temperature distribution of the table becomes possible with resultant reduced thermal deformation of the table so that the table can be rotated at high speed.

14 Claims, 3 Drawing Sheets

STATIC PRESSURE TABLE DEVICE WITH A TAPERED SURFACE

BACKGROUND OF THE INVENTION

This invention relates to a static pressure table device, and more particularly, to a static pressure table device suitable for use as a slide bearing of a large size precision machine tool.

In large size machine tools, a static pressure table device has been used as a means for rotatably supporting a rotary table on a bed. In this table device, static pressure oil is supplied between the contact surfaces of the bed and the table, the oil acting as a medium for supporting the rotary table. In this device, pressurized oil is supplied to a gap between the contact surfaces for providing a load supporting function which is used for rotatably supporting the rotary table so as to effect a precision finish machining of a workpiece mounted on the rotary table.

For suppressing temperature variation as small as possible, it has been the practice to prevent an influence of generated heat by controlling the temperature of the static pressure oil, the room temperature and the machine temperature or to form an annular recess or recesses in the contact surface of the bed and supply a static pressure oil into the recess or recesses in a manner to enable pressure changes in the static pressure oil.

As a reference describing a static pressure lubrication theory of a slide bearing utilizing static pressure oil, a publication is known which is entitled "static pressure lubrication theory" and published Feb. 9, 1968 by Japan Institute of Lubrication (Nihon Junkatsu Gakkai) (Editor: Yoshiro Mori).

The static pressure table device (slide bearing) described above is used mainly for a ultra-high precision machine tools or machine tools for machining a workpiece of large size and heavy weight. For this reason, shearing heat is generated in the static pressure oil in the gap between the bed and the rotary table due to shearing forces produced by the relative motion therebetween, and the shearing heat directly affects the machining accuracy. Particularly, because the temperatures due to the heat generated in the manner described above differ at the central portion and the peripheral portion of the rotary table, the rotary table undergoes thermal deformation (deflection) as in the case of a bimetal. More specifically, where the oil is supplied from the stationary side (bed side), a portion of the shearing heat in the oil is transmitted to the rotary table side, causing a temperature difference between the bed and the rotary table so that there occurs deformation of the rotary table having a smaller heat capacity than the bed. As a consequence, the static pressure gap varies, with the result that high speed rotation of the table becomes impossible. For this reason, in case where thermal deformation due to high speed rotation occurs, it was necessary to rotate the table at low speed for enabling precision machining.

If, for the purpose of suppressing the heat generation in the static pressure gap, the static pressure oil is supplied after lowering its temperature, the temperature at the central portion of the rotary table will decrease too much so that a temperature difference will be created between the central portion and the peripheral portion of the table and a thermal deformation of the table will inevitably occur.

While it is necessary to form an annular recess on the upper surface of the bed for the purpose of compensating for elastic deformation of the bed and of maintaining static oil pressure when the elastic deformation occurs, the amount of deformation is large in the case of a large size machine tool, and in this regard it is necessary to use a pump of a large capacity for supplying the static pressure oil. This large capacity oil supply pump has a disadvantage in that it requires a large energy as well as a large amount of cooling system.

The reference cited above describes analyses of the pressure of the lubricating oil, but does not refer to the technique regarding heat so that this reference does not suggest any solution of the problem caused by heat.

SUMMARY OF THE INVENTION

Accordingly, it is an object of this invention to provide a novel static pressure table device capable of preventing a temperature difference between the central portion and the peripheral portion on the sliding surface of a rotary table, of enabling high speed rotation by preventing thermal deformation of the rotary table, and of preventing decrease in the accuracy at the time of precise machining.

According to this invention, there is provided a static pressure table device wherein a rotary table is rotatably supported on a bed by static pressure oil in a static pressure gap formed between confronting surfaces of the bed and the table, characterized in that the stationary pressure gap has a configuration increasing in cross-sectional thickness from a central portion of the device toward a peripheral portion thereof.

Preferred embodiments of the present invention will become understood from the following detailed description with reference to the accompanying drawings.

DESCRIPTION OF THE PREFERRED EMBODIMENTS

Figure 1:
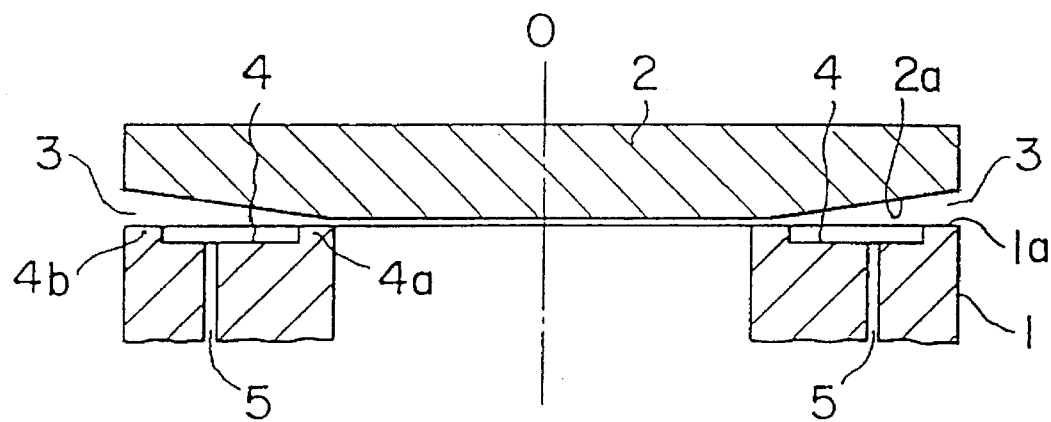
FIG. 1 is a fragmentary diagrammatic view, in vertical section, showing an embodiment of the static pressure table device according to this invention.

Referring now to FIG. 1, a static pressure table device has a bed 1 and a rotary table 2 rotatable about a vertical axis O. A static pressure gap 3 is formed between confronting surfaces 1a and 2a of the bed 1 and the rotary table 2. The gap 3 is constructed such that the thickness thereof increases from a radially inner portion thereof to the peripheral portion of the bed 1, as exaggeratedly shown in FIG. 1.

Figure 2:
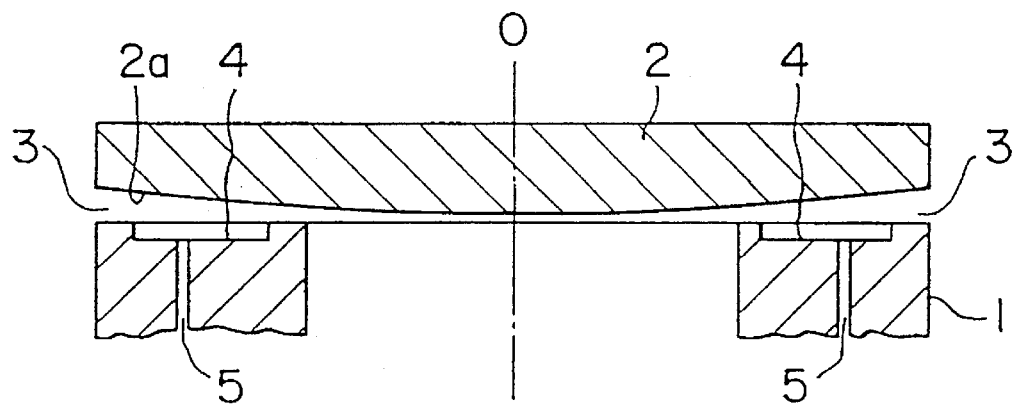
FIG. 2 is a vertical sectional view showing a modification of the embodiment of FIG. 1.

The confronting surface 1a of the bed 1 is formed with a basically annular recess 4 having its center on the axis O of the rotary table 1. The recess 4 is defined between an inner peripheral land 4a and an outer peripheral land 4b. These lands form the static pressure gap 3 together with the confronting surface 2a of the rotary table 2. As depicted in FIGS. 1 and 2, the static pressure gap 3, which is defined by the confronting surfaces 1a and 2a, has a vertical width that increases along at least a portion of the gap 3 extending between the radially inner peripheral land 4a and the radially outer peripheral lange 4b with respect to a radially outward direction.

In the embodiment of the invention shown in FIG. 1, the lower or confronting surface 2a of the rotary table 2 is tapered or inclined upwardly from the central portion to the outer peripheral portion, whereby the sectional configuration or thickness of the static pressure gap 3 gradually increases linearly from the central portion toward the outer peripheral portion. As shown in FIG. 1, the vertical width of the gap 3 continuously increases between the inner and outer peripheral lands 4a and 4b. Static pressure supply passages 5 are formed in the bed 1 so as to communicate with the recess 4 to supply pressurized oil thereinto from a pressurized oil source.

In a modified embodiment of the invention shown in FIG. 2, the upwardly tapered confronting surface 2a of the rotary table 2 is made spherical so as to gradually increase the thickness of the static pressure gap 3 from the central portion to the peripheral portion.

Figure 3:
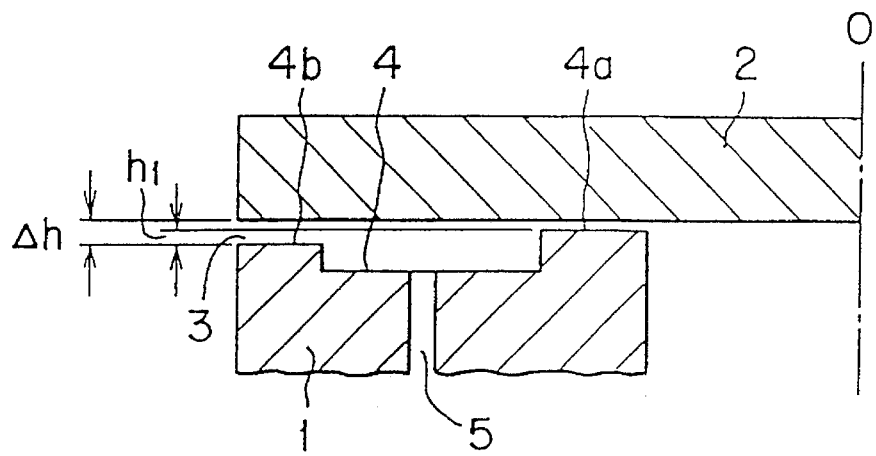
FIG. 3 is a fragmentary view, in vertical section, showing another embodiment of this invention.

In a further embodiment of the invention shown in FIG. 3, the heights of the inner peripheral land 4a and the outer peripheral land 4b are made different by hl, that is, the inner land 4a is higher than the outer land 4b by hl so as to make the thickness of the static pressure gap 3 to stepwisely increase. More specifically, the sectional configuration of the static pressure gap 3 is changed at the inner and outer peripheral portions with respect to the entire gap height Δh.

In each of the embodiments of the invention described above, the widths, with respect to the radial direction, of the inner and outer peripheral lands 4a and 4b may be made equal.

With the construction described above, the rotary table 2 is caused to rotate relative to the bed 1. During the rotation of the table 2, the viscosity resistance of the static pressure oil in the gap 3 is reduced in the outer periphery having a large peripheral speed because of the enlarged clearance toward the outer periphery, so that reduced heat will be generated in the outer peripheral portion and therefore generated heat quantities in the central portion and the outer peripheral portion will become almost equal. For this reason, the deformation (reflection) of the rotary table 3 caused by heat will be prevented. In this case, the static pressure gap 3 is designed such that the amount of the shearing energy needed due to the viscosity of the static pressure oil and the amount of the thermal energy removed or carried away by the static pressure may substantially be equal.

Figure 4:
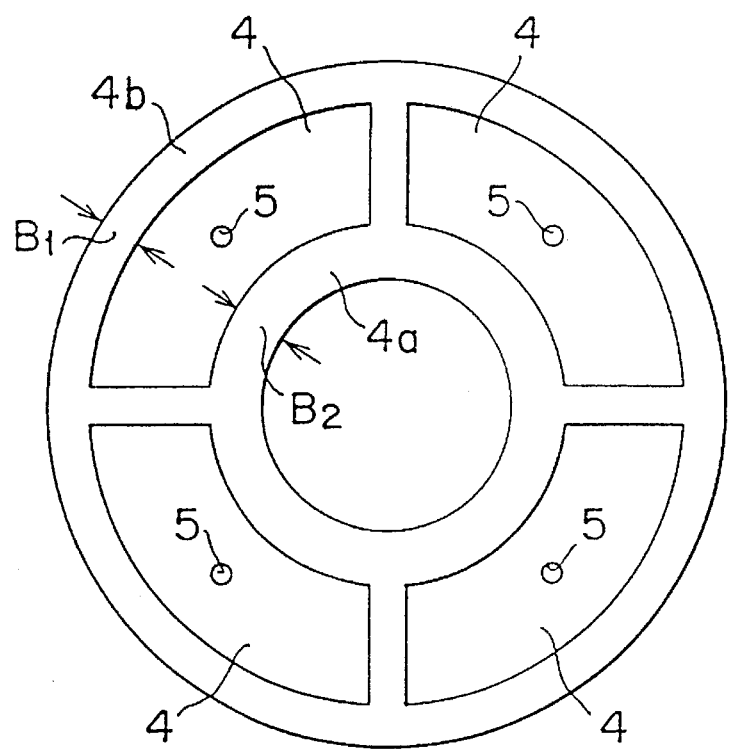
FIG. 4 is a plan view showing the configuration of recesses and the widths of lands.

In an embodiment shown in FIG. 4, the radial widths of the inner peripheral land 4a and the outer peripheral land 4b are made unequal such that the quantities of heat generated in the central portion and the peripheral portion will be equal. More particularly, the width $B_1$ of the outer land 4b is made smaller than the width $B_2$ of the inner land 4a so as to reduce the viscosity resistance of the static pressure oil in the outer peripheral portion, for suppressing heat generation in the outer peripheral portion. As will be understood from FIG. 4, the annular recess 4 is divided into arcuate recess sections by radially extending lands and oil supply passages 5 are provided for respective recess sections. This arrangement may be adopted in the embodiments of FIGS. 1 through 3.

In a further embodiment of the invention, a plurality of concentric annular recesses each corresponding to the recess 4 described before are provided on the bed 1, and static pressure oil is supplied to each recess. The thickness of the static pressure oil is formed constant. The flowrates or temperatures of the static pressure oil to be supplied to the concentric recesses are varied depending upon the quantities of heat generated in the oil in the respective recesses such that the rotary table will have a uniform temperature distribution.

The quantity of heat generated in the static pressure gap by the rotation of the table due to the viscosity of the static pressure oil is calculated as follows.

The torque for rotating the rotary table is given by the equation (1) below.

$$T = \pi^2 \times \mu \times N(D^4 - d^4)/60 \times 16 \times h \tag{1}$$

where:

T . . . torque (kgf·m)

μ . . . viscosity coefficient (kgf·sec./m²)

N . . . rotational speed of table (rpm)

D . . . outer diameter of static pressure gap (m)

d . . . inner diameter of static pressure gap (m)

h . . . thickness of static pressure gap (m)

The power loss $Q_w$ (kW) is calculated by the following equation (2).

$$Q_w = \pi^3 \times \mu \times N^2 \times g \times (D^4 - d^4)/60 \times 8 \times h \tag{2}$$

This equation (2) shows that the power loss (therefore the quantity of heat generated) is proportional to the second power of the rotational speed and the fourth power of the table diameters of the static pressure gap. The varying thickness of the static pressure gap can be determined based on the equation (2) so that the temperature of the table will become uniform.

When the gap is formed constant and a varying quantity of static pressure oil is supplied depending upon the heat being generated, so as to control the temperature, the equation (3) below can be used.

$$Q_w = S \times \rho \times Q \times Td \tag{3}$$

where:

S . . . specific heat (kcal/kg. °C.)

ρ . . . density of oil (kg/l)

Q . . . oil flowrate (l/sec.)

Td . . . Temperature difference between inlet and outlet of gap (°C.)

Then the temperature of the confronting surfaces (sliding surfaces) becomes equal to the heat quantity removed by the oil.

When the configurations of the inner peripheral land 4a and the outer peripheral land 4b are made different, an equation (4) below representing the flowrate of the oil flowing over each land can be calculated by the following equation (4). This equation is shown in the publication titled "static pressure lubrication theory" referred to above.

$$Q = \frac{\pi \times P \times h}{6\mu} \cdot \frac{1}{l\frac{D}{d}} \tag{4}$$

where:

Q . . . flowrate of oil (m³/sec)

p . . . oil pressure in recess (kgf/cm²)

h . . . thickness of static pressure gap (mm)

μ ... viscosity coefficient of static pressure oil (kgf·sec/cm$^2$)

ln ... natural logarithm

D ... outer diameter of land d ... inner diameter of land

From the equation (4), the temperature rise of the static pressure oil can be calculated by the following equation (5).

$$Tt = k \cdot \frac{N^2 \times (D^4 - d^4)}{h^4} \times \ln \cdot D/d \; (°C.) \quad (5)$$

where

Tt ... temperature rise (°C.)

k ... constant

Where the sectional configuration of the stationary pressure gap is varied, the following equation (6) is obtained from equation (5).

$$h = \sqrt[4]{\frac{KN^2(D^4 - d^4)\ln \cdot D/d}{Tt}} \quad (6)$$

From equation (6) we can obtain the value of h at respective points.

Figure 5:
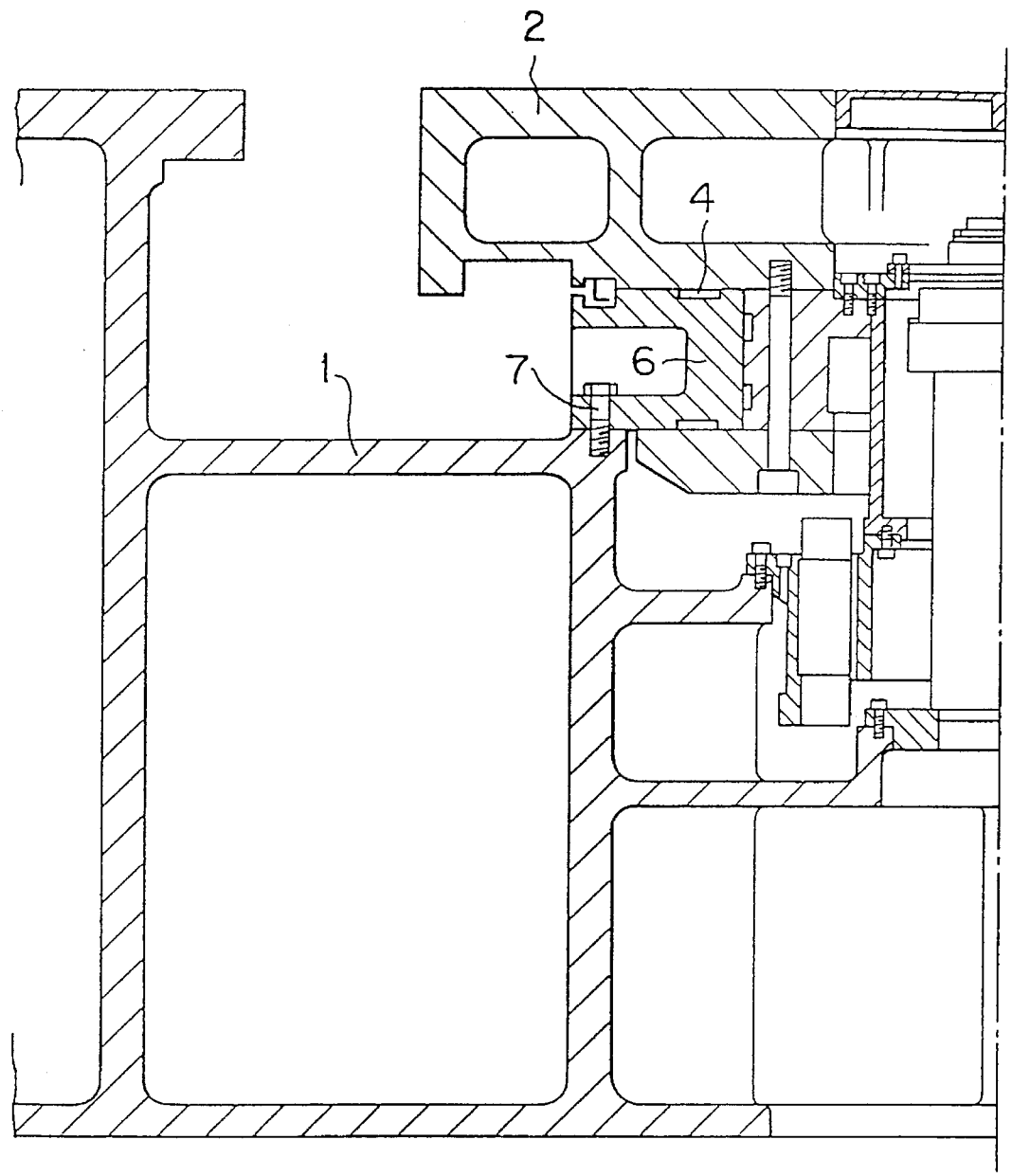
FIG. 5 is a fragmentary vertical section showing an example of a bearing portion between a bed and a rotary table.

FIG. 5 is a vertical sectional view showing a construction wherein a rotary table 2 rotatably mounted on a bed 1 slides along an upper surface, an inner surface and a lower surface of a bearing member 6 fixed to the bed 1 by means of screws 7. Such construction is also covered by this invention as one of applications thereof. A recess 4 may be formed on the upper surface of the bearing member 6, facing the rotary table 2 and the static pressure oil can be supplied from the side of the rotary table 2.

As above described, according to this invention, it is possible to make equal the quantities of heat generated in the stationary pressure gaps between the bed and the table, in the central and peripheral portions thereof, whereby it is possible to prevent thermal deformation of the rotary table caused by heat, so that the table can be rotated at high speed while maintaining the machining accuracy.

What is claimed is:

1. A static pressure table device having a central portion and a peripheral portion and comprising a bed, a rotary table rotatably supported on said bed with a static pressure gap formed between confronting surfaces of said bed and said table, basically annular recess means formed in said confronting surface of said bed, and static pressure oil supply means for supplying static pressure oil into said recess means to thereby cause said static pressure oil to flow toward said peripheral portion and to thereby rotatably support said rotary table, wherein said basically annular recess means is a basically annular recess retaining a static pressure oil therein for rotatably supporting said rotary table, said recess being defined between radially outer and inner peripheral lands, wherein said outer peripheral land is smaller in radial width than said inner peripheral land, and wherein a peripheral portion of one of said confronting surfaces is formed so as to be tapered away from the other confronting surface such that a vertical width of said static pressure gap increases along at least a portion of said static pressure gap positioned between said radially inner peripheral land and said radially outer peripheral land with respect to a radially outward direction.

2. A static pressure table device having a central portion and a peripheral portion and comprising a bed, a rotary table rotatably supported on said bed with a static pressure gap formed between confronting surfaces of said bed and said table, basically annular recess means formed in said confronting surface of said bed, and static pressure oil supply means for supplying static pressure oil into said recess means to thereby cause said static pressure oil to flow toward said peripheral portion and to thereby rotatably support said rotary table, wherein said basically annular recess means is a basically annular recess retaining a static pressure oil therein for rotatably supporting said rotary table, said recess being defined between radially outer and inner peripheral lands, and wherein a peripheral portion of one of said confronting surfaces is formed so as to be tapered away from the other confronting surface such that a vertical width of said static pressure gap increases along at least a portion of said static pressure gap positioned between said radially inner peripheral land and said radially outer peripheral land with respect to a radially outward direction.

3. The static pressure table device according to claim 2, wherein said one of said confronting surfaces has a first region and a second region at a periphery of said first region, wherein said second region is disposed at an angle with respect to said first region, such that said second region is tapered linearly.

4. The static pressure table device according to claim 2, wherein said one of said confronting surfaces is tapered curvilinearly.

5. The static pressure table device according to claim 2, wherein said outer peripheral land is lower in height than said inner peripheral land.

6. The static pressure table device according to claim 2 further comprising a bearing member securely mounted on an upper surface of said bed, said bearing member having an upper surface that defines said confronting surface of said bed.

7. The static pressure table device according to claim 1, wherein said one of said confronting surfaces has a first region and a second region at a periphery of said first region, wherein said second region is disposed at an angle with respect to said first region, such that said second region is tapered linearly.

8. The static pressure table device according to claim 1, wherein said one of said confronting surfaces is tapered curvilinearly.

9. The static pressure table device according to claim 1, wherein said outer peripheral land is lower in height than said inner peripheral land.

10. The static pressure table device according to claim 1 further comprising a bearing member securely mounted on an upper surface of said bed, said bearing member having an upper surface that defines said confronting surface of said bed.

11. The static pressure table device according to claim 1, wherein said one of said confronting surfaces is said confronting surface of said table.

12. The static pressure table device according to claim 1, wherein said vertical width of said static pressure gap continuously increases along at least said portion of said static pressure gap positioned between said radially inner peripheral land and said radially outer peripheral land with respect to said radially outward direction.

13. The static pressure table device according to claim 2, wherein said one of said confronting surfaces is said confronting surface of said table.

14. The static pressure table device according to claim 2, wherein said vertical width of said static pressure gap continuously increases along at least said portion of said static pressure gap positioned between said radially inner peripheral land and said radially outer peripheral land with respect to said radially outward direction.

* * * * *